Figure 1:
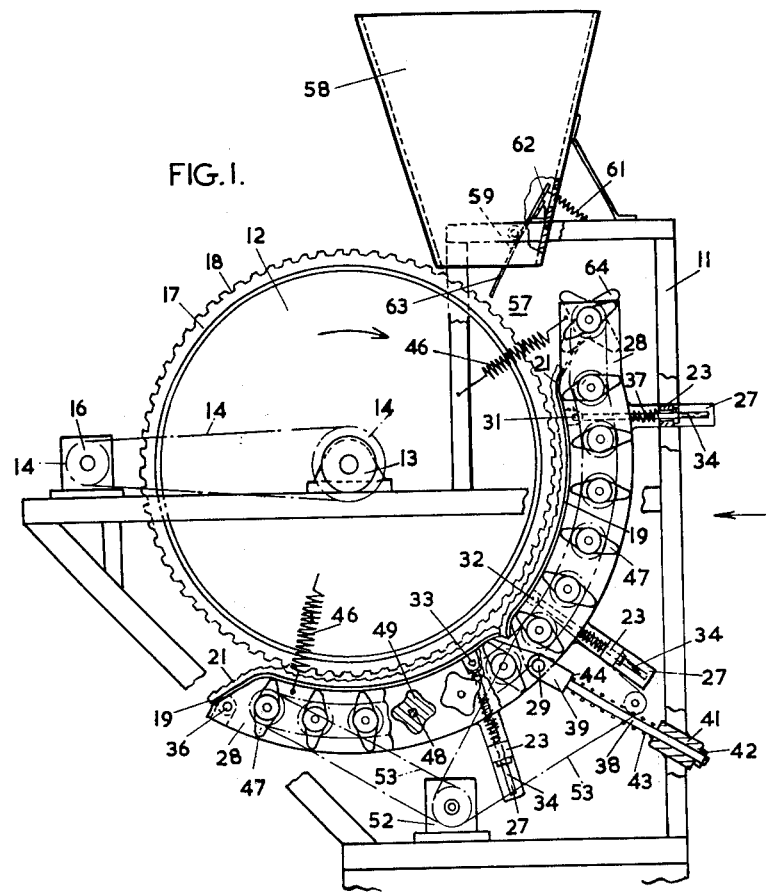

United States Patent [19]
Richardson

[11] 3,935,867
[45] Feb. 3, 1976

[54] STRIPPING OF BRUSSELS SPROUTS FROM THEIR STEMS

[75] Inventor: George Wilfred Richardson, Barrow-on-Humber, England

[73] Assignee: Produits Findus S.A., Vevey, Switzerland

[22] Filed: June 17, 1974

[21] Appl. No.: 479,759

[52] U.S. Cl............... 130/30 R; 130/5 C; 130/5 D; 130/6; 130/30 J
[51] Int. Cl.² ........................................ A01F 11/00
[58] Field of Search ......... 130/30 R, 30 J, 5 C, 5 D, 130/6

[56] References Cited
UNITED STATES PATENTS

| | | |
|---|---|---|
| 1,567 | 4/1840 | Gladwin ............................ 130/6 |
| 19,809 | 3/1858 | Bergen .............................. 130/6 |
| 318,041 | 5/1885 | Schofield ........................... 130/6 |
| 322,964 | 7/1885 | Pitts et al. ......................... 130/6 |
| 636,026 | 10/1899 | Donovan ........................... 130/6 |
| 641,200 | 1/1900 | Ferri .................................. 130/6 |
| 1,821,316 | 9/1931 | Oakes ................................ 130/6 |
| 2,325,654 | 8/1943 | Borchers ........................... 130/6 |
| 2,842,139 | 7/1958 | Carlson .............................. 130/6 |

FOREIGN PATENTS OR APPLICATIONS 956,028   4/1964   United Kingdom ............... 130/30 R

*Primary Examiner*—Paul E. Shapiro
*Attorney, Agent, or Firm*—Watson Leavenworth Kelton & Taggart

[57] ABSTRACT

A method of stripping Brussels sprouts from their stems wherein the sprout plants are fed laterally in succession to the nip between a soft resilient surface of a movable member and a series of laterally spaced pressure members each having a soft resilient surface yieldably urged towards the surface of the movable member, the movable member and the pressure members being adapted to cause rotation of each plant substantially about the axis of its stem as it passes into and through the nip, and the sprouts are removed from the stems by a series of successions of resilient stripping members with the members of each succession being spaced apart in the direction of movement of the plants and adapted to exert resilient stripping pressure on the sprouts as the plants pass rotatably along the nip, the series of stripping members and pressure members alternating in the lateral direction of the nip. An apparatus for carrying out the method is also disclosed.

20 Claims, 8 Drawing Figures

STRIPPING OF BRUSSELS SPROUTS FROM THEIR STEMS

This invention relates to the stripping of Brussels sprouts from their stems and has for an object to perform such stripping action in a substantially automatic manner.

According to the present invention, Brussels sprout plants are fed laterally in succession to the nip between a soft resilient surface of a movable member and a series of laterally spaced pressure members each having a soft resilient surface yieldably urged towards the surface of the movable member, the movable member and the pressure members being adapted to cause rotation of each plant substantially about the axis of its stem as it passes into and through the nip, and the sprouts are removed from the stems by a series of successions of resilient stripping members with the members of each succession being spaced apart in the direction of movement of the plants and adapted to exert resilient stripping pressure on the sprouts as the plants pass rotatably along the nip, the series of stripping members and pressure members alternating in the lateral direction of the nip.

In apparatus according to the invention, there is provided a movable member having a soft resilient surface, a series of pressure members extending in the direction of movement of said movable member and each having a soft resilient surface arranged in spaced opposed relationship with the surface of said movable member, said pressure members being spaced apart in a direction tranverse to that of movement of said movable member, means for yieldably urging said pressure members towards the surface of said movable member to provide a resilient nip, and a series of resilient stripping members spaced apart in the direction of movement of said movable member in each of the spaces between adjacent pressure members.

At the feeding position of the apparatus, the pressure members are preferably flared outwardly away from the operative surface of the movable member so as to form a mouth for guiding the plants towards the resilient nip.

The movable member is conveniently in the form of a drum rotatably mounted in a supporting framework and driven by suitable gearing, e.g., chain or belt gearing, from a source of power, a variable speed drive preferably being provided so as to provide for different crop conditions. With such construction, the pressure members are preferably in arcuate form extending over a substantial part of the periphery of the drum, e.g., over 150° or more, and are connected together in positive spaced relationship over the width of the drum by a series of stays on which the individual pressure members are yieldably mounted individually so as to be movable towards and away from the surface of the drum independently of each other. The stays themselves are secured to a pair of arcuate frames mounted on the supporting framework one adjacent each end of the drum. The mounting of the frames provides for yieldably urging the frames towards the drum surface. The frames are preferably articulated at a point approximately midway along their periphery.

Conveniently, the arcuate frames also serve rotatably to mount the stripping members which may be in the form of rubber rollers formed with axial lobes constituting the strippers proper, the rollers being mounted on common shafts extending from the arcuate frames. The roller shafts are conveniently connected one to the other by individual chain or belt gearing so that they all rotate in the same direction, a common, preferably variably speed, drive being provided for the shafts at one of the frames.

The drum is rotated in a sense to cause its surface to move towards the feeding mouth while the stripping rollers are rotated in the opposite sense to cause their peripheries opposing the drum to move in the same peripheral direction as that of the drum.

As explained above, the stripper rollers in each succession are spaced apart in the peripheral direction of the drum, and it is found very desirable to stagger (peripherally of the drum) the rollers in each adjacent succession. In this manner, adequate space is provided for the stripped sprouts to pass between the rollers into a delivery container or band.

There is preferably arranged adjacent the feeding mouth a hopper for containing a quantity of plants positioned with their stems extending in the lengthwise direction of the drum, the hopper opening on to the surface of the drum and being conveniently formed with a pivoted forward wall spring-loaded inwardly of the hopper. Such a hopper may be fed manually or directly from a harvester for the plants, the whole apparatus being mounted in association with the harvester in such a case.

In an alternative construction, the movable member may be constituted by an endless band having one lap in opposed substantially parallel relationship with the series of laterally spaced pressure members. In such a case, the stripping members are rotatably mounted in a pair of end frames connected together by a series of stays serving yieldably to mount the individual pressure members in a manner similar to that described above in connection with the arcuate frames mounted on the supporting framework. The one lap opposed to the pressure members is conveniently yieldably urged towards those members by a spring-loaded dead plate or a series of closely spaced spring-loaded rollers.

The soft resilient material, e.g., rubber, of the surfaces of the drum and the pressure members is very desirably of sufficient depth and softness, e.g., 30° Shore Hardness, as to allow a sensible part of the sprout to sink into the nip as the plant is rolled along. Similarly, the stripping rollers, or at least the stripper lobes, are of such a softness as to avoid any substantial damage to the sprouts, though it will probably be found that, for effective removal of the sprouts from the stems, the lobes will need to be of a somewhat greater hardness e.g., 40° Shore, than the drum.

It will be understood that the "soft resilient material" referred to herein may be in the form of inflatable bags or tubes to which pneumatic pressure is applied to give a yieldability equivalent to that described above.

Figure 5:
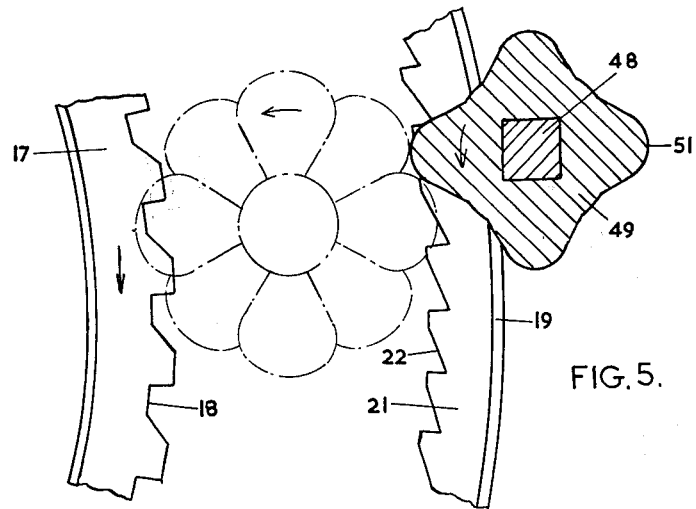
Figure 2:
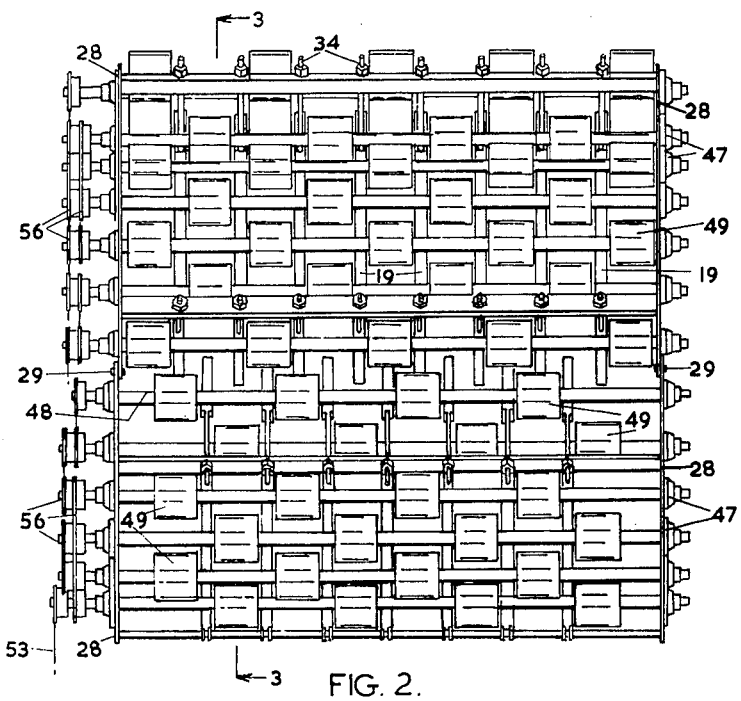
Figure 4:
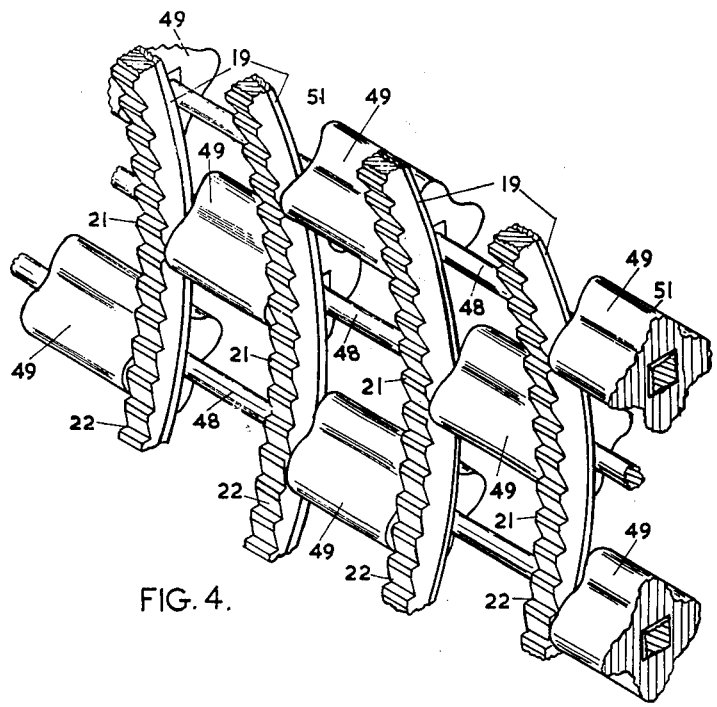
Figure 3:
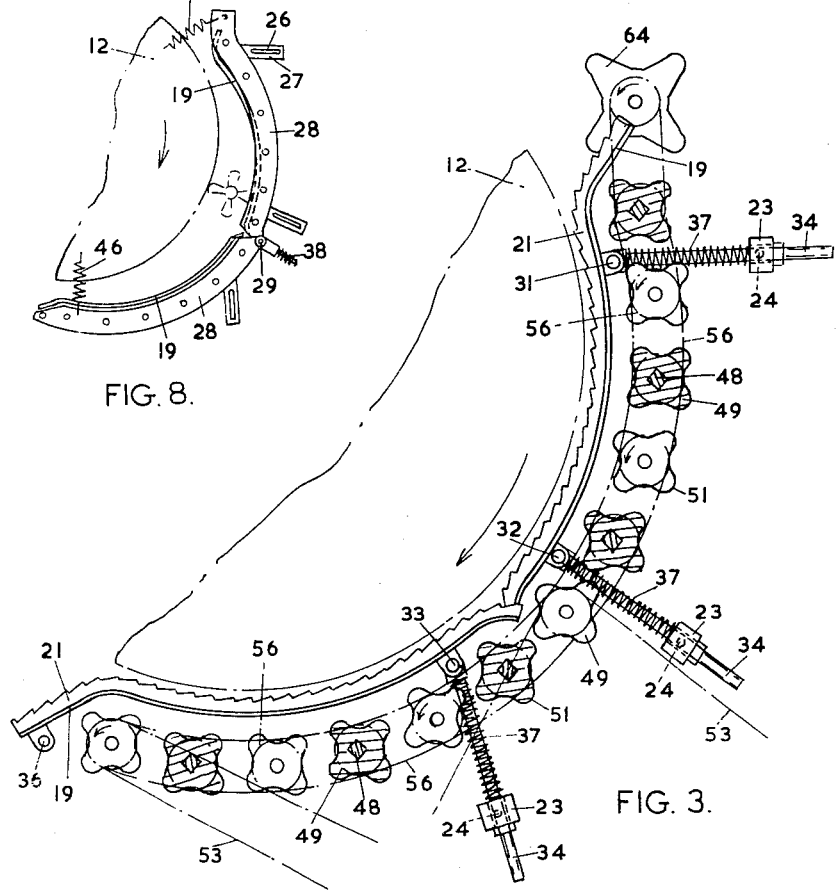

By way of example, the invention will now be described in greater detail with reference to the accompanying diagrammatic drawings in which FIG. 1 is an elevation showing the essential working parts of an apparatus according to the invention, FIG. 2 is an end view of the apparatus shown in FIG. 1, in the direction of the arrow in FIG. 2, with parts removed for clarity of illustration, FIG. 3 is a section view taken on the line 3—3 in FIG. 2, FIG. 4 is an isometric view from the interior of the apparatus showing the relationship between parts of the apparatus, FIG. 5 is a detail of the apparatus shown in FIG. 1, drawn to a larger scale than FIG. 1, and FIGS. 6, 7 and 8 are diagrams illustrating the operation of the apparatus.

A main framework 11 of fabricated construction rotatably supports a feed drum 12 by means of journal bearing pedestals 13, the drum being driven through chain and sprocket gearing 14 by a variable speed hydraulic motor 16 mounted on the main framework 11. The drum is 84 cm in diameter × 122 cm long, and the periphery of the drum 12 is provided with a covering 17 of rubber having a hardness of approximately 30° Shore, the radial thickness of the covering 17 being 4 cm. The periphery of the rubber covering 17 is formed with lateral grooves 18 1.3 cm deep and peripherally spaced at 4 cm intervals, the cross-sectional shape of the grooves being as shown in FIG. 5. The drum is driven at a speed which may be varied between, say, 10 and 20 r.p.m. according to crop variety and condition.

Arranged about a portion of the periphery of the drum 12 is a series of laterally spaced pressure members 19 of arcuate shape and 2.5 cm in width and each provided with a covering 21 of rubber having a hardness of approximately 40° Shore, the radial thickness of the covering 21 being 2.5 cm. The lateral spacing of the pressure members 19 is 10 cm, i.e., they are pitched at 12.7 cm along the length of the drum 12. The covering 21 is formed with lateral grooves 22 1 cm deep and peripherally spaced at 2.5 cm intervals, the cross-sectional shape of the grooves 22 being as shown in FIG. 5.

The grooves 18 and 22 are found to give added "bite" to the soft resilient nip, and it will be understood that the cross-sectional shape and size of the grooves are determined largely experimentally, and may be varied, if necessary or desirable, to suit different crops of crop conditions. Experiment has shown, however, that the grooves described above have been found satisfactory in dealing with crops having a substantial variation in the size of the individual sprouts.

The pressure members 19 extend over an arc of approximately 150° around the drum 12 and are connected together in positive spaced relationship over the width of the drum by a series of stays 23 of tubular square cross-section themselves adjustably secured by bolts 24 in slots 26 formed in brackets 27 extending from a pair of arcuate frames 28 articulated on a pivot pin 29 by means of which the frames are mounted on the supporting framework 11, one adjacent each end of the drum 12. The pressure members 19 are pivotally attached at 31, 32 and 33 to supporting studs 34, which pass through lateral slots in the stays 23, and at 36 directly to the adjacent stay 23. Compression springs 37 are interposed between the pressure members 19 pivoted at 31, 32 and 33 and the stays 23 to provide individual yieldability in those pressure members.

As mentioned above, the articulated frames 28 are mounted on the framework 11 by means of the pivot pins 29, there being mounted on each pin 29 one end of a connecting rod 38 provided with a universal joint 39, the other end of each connecting rod 38 passing through a support bracket 41 mounted on the framework 11 and being adjustably positioned by a nut 42 engaging the threaded end of the rod 38. The frames 28 are yieldably urged at the pivot point towards the drum 12 by means of compression springs 43 embracing the rods 38 and each bearing at one end against a shoulder 44 on the respective rod 38 and at the other end against the end face of the respective support bracket 41, and also at their free ends by tension springs 46.

Rotatably mounted in the articulated frames 28 by means of self-aligning bearing blocks 47 is a series of carrier shafts 48 to which is secured at axially spaced intervals a series of stripping rollers 49 formed from rubber of a similar nature to that of the covering 21 of the pressure members 19, the stripping rollers each being formed with four lobes 51 constituting the strippers proper. The stripping rollers 49 are aligned with the lateral spaces between the pressure members 19 themselves, as well as the lateral spaces between the end pressure members 19 and the frames 28.

The carrier shafts 48 are driven in two groups from a hydraulic motor 52 by chain and sprocket gearing 53, the shafts of each group being connected one to the other by individual chain and sprocket gearing 56 so that they all rotate in the same direction.

The drum 12 is rotated in a sense to cause its surface to move towards a feeding mouth generally indicated by reference numeral 57 while the stripping rollers 49 are rotated in the opposite sense to cause their peripheries opposing the drum 12 to move in the same peripheral direction as that of the drum 12.

The stripping rollers 49 in adjacent successions are staggered (peripherally of the drum 12) so as to leave adequate space for the stripped sprouts to pass between the rollers 49 into a delivery container or conveyor band (not shown).

Adjacent a feeding position between the pressure members 19 and the drum 12, there is provided a hopper 58 into which the sprout plants are fed with their stems extending generally in the lengthwise direction of and parallel to the drum 12, the hopper 58 opening on to the surface of the drum 12 and being provided with a wall portion, generally indicated by reference numeral 59, pivotally mounted on the framework 11 and yieldably urged towards the hopper 58 by springs 61. The wall portion 59 is constituted by a supporting bar 62, to which the springs 61 are attached, and a series of spring tines 63 secured at spaced intervals along the bar 62 and being individually yieldable under their inherent spring tension. It is found that such construction tends to orientate any sprout plant that tends to approach the wall portion 59 in an attitude other than parallel to the surface of the wall portion 59 and the drum 12.

At the feeding position, the pressure members 19 are flared outwardly away from the operative surface of the drum 12 so as to form with the drum surface the feeding mouth 57, and there is rotatably mounted in the frames 28 a lobed rubber guide roller 64, similar to the stripper rollers 49, in such a position that, upon rotation, its lobes successively enter the mouth 57 to assist in guiding the successive sprout plants into the resilient nip formed by the surfaces of the drum 12 and the pressure members 19. The guide roller 64 is driven by chain and sprocket gearing from the adjacent stripping roller shaft 48.

In operation, the sprout plants pass successively into the feeding mouth 57 and are resiliently gripped and rotated between the opposing surfaces of the drum 12 and pressure members 19 as the plants are rolled along the pressure members, the sense of rotation being the same as that of the stripping rollers 49 so that the meeting portions of the rollers 49 and the sprouts move in opposite peripheral direction. In this manner, the stripping lobes 51 effectively remove the sprouts from the stems by resilient pressure causing no substantial damage to the sprouts. The stripped stems of the plants, of course, pass completely through the resilient nip and are discharged into a waste bin or disposal conveyor (not shown).

It will be seen from the above description that each articulated portion of the frames 28 supports a group of the stripping rollers 49 and it is found in practice, presumably because the majority of the sprouts are stripped during the first half of the stripping period and are thus more dense on the stems during that period, that it is preferable to drive the group of stripping rollers 49 first to be met by the sprouts at a somewhat slower speed than the rollers 49 of the other group.

Thus with a drum speed of the order indicated above, the plants are adequately spaced apart as they are rolled along the resilient nip and satisfactory stripping is effected (using stripping rollers of an outside diameter of the order of 10 cm by driving the rollers of the first group at 240 r.p.m. and those of the other group at 340 r.p.m.

Because of the independent yieldable movement of the pressure members 19 relatively to the articulated frames 28 on which they are mounted, and the yieldable movement of the frames 28, both bodily relatively to the drum 12 on their supporting rods 38 and independently about the articulation pivot pin 29, the movements of the various components are somewhat complex during the passage of the plants through the resilient nip. To allow of such movements, the position of the stays 23 and the axes of those studs 34 that are movable in the stays have to be considered and determined to some extent, experimentally.

Figure 6:
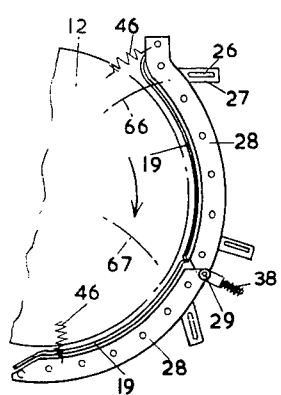
Figure 7:
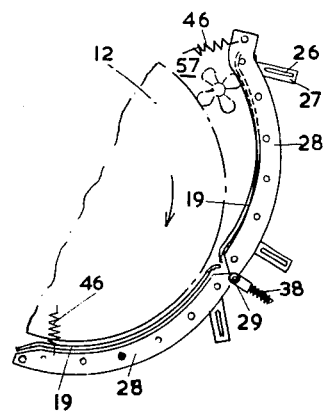
Figure 8:
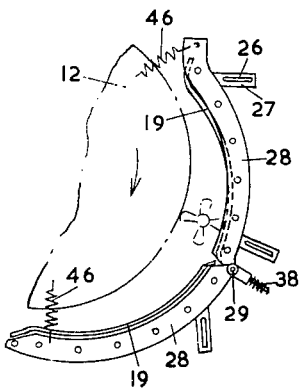

Thus, referring to FIGS. 6, 7 and 8, there are illustrated diagrammatically typical movements of the pressure members 19 and the articulated frames 28 during the passage of a single sprout plant along the resilient nip. As the plant enters the feed mouth 57, the drum 12 pushes the plant against the pressure members 19 on the upper portion of the articulated frames 28 causing them to move about the lower pivot 32 and at the same time to slide in the upper stays 23 against the action of the springs 37, and to allow the latter movement to take place, the longitudinal axis of the slots 26 in the upper brackets 27 and the axes of the guiding holes in the stays 23 are arranged approximately tangential to an arc 66 struck from the lower pivot 32 at a point on the arc determined by the mean radius of the arc of movement of the pressure members 19 determined by the maximum diameter of the plant. Such movement causes the upper articulated frame 28 to pivot, under the influence of the springs 37, about the articulation pivot 29 to an extent determined by the tension in the springs 46. The latter urge the stripping rollers to pass between the pressure members 19 to perform the stripping action.

As the plant rolls towards the articulation pivot 29 the articulated frames 28 move bodily with the pressure members 19 against the action of the springs 46, the axes of the articulation pivots moving axially of the supporting rods 38. Such movement is permitted by arranging the longitudinal axes of the slots 26 in the lower brackets 27 of the upper frames 28 and the axes of the guiding holes in the corresponding stay 23, approximately radially of the drum when in its mean position. During such motion of the frames 28, the pressure members 19 on the lower portions of the frames 28 pivot about their pivots 36 on the frames 28, and to allow of this movement, the slots 26 in the brackets 27 on the lower portion of the frames 28 have their longitudinal axes lying approximately tangential to an arc 67 struck from the axis of the pivot 36 at a point on the arc determined by the mean radius of the arc of movement of the pressure members 19, the axes of the guiding holes in the corresponding stay 23 also lying approximately tangential to that arc.

I claim:

1. A method of stripping Brussels sprouts from their stems comprising the steps of; feeding the plants laterally in succession to the nip between a soft resilient surface of a movable member and a series of laterally spaced pressure members each having a soft resilient surface yieldably urged towards the surface of the movable member, moving said movable member relative the pressure members to cause rotation of each plant substantially about the axis of its stem as it passes into and through the nip, and passing each rotating plant into contact with a series of successions of resilient rotating stripping members as the plants pass along the nip to remove the sprouts from their stems, the members of each succession being spaced apart in the direction of movement of the plants and exerting resilient stripping pressure on the sprouts, the series of stripping members and pressure members alternating in the lateral direction of the nip.

2. Apparatus for stripping Brussels sprouts from their stems comprising a movable member having a soft resilient surface, a series of pressure members extending in the direction of movement of said movable member and each having a soft resilient surface arranged in spaced opposed relationship with the surface of said movable member, said pressure members being spaced apart in a direction transverse to that of movement of said movable member, means for yieldably urging said pressure members towards the surface of said movable member to provide a resilient nip, and a series of resilient stripping members spaced apart in the direction of movement of said movable member in each of the spaces between adjacent pressure members.

3. Apparatus as in claim 2, wherein the pressure members are flared outwardly away from the operative surface of the movable member so as to form a mouth for guiding the plants towards the resilient nip.

4. Apparatus as in claim 2 wherein the movable member is in the form of a drum rotatably mounted in a supporting framework and driven by suitable gearing, from a source of power.

5. Apparatus as in claim 4, wherein the gearing includes a variable speed drive.

6. Apparatus as in claim 4 wherein the pressure members are in arcuate form extending over a substantial part of the periphery of the drum.

7. Apparatus as in claim 6, wherein the pressure members are connected together in positive spaced relationship over the width of the drum by a series of stays on which the individual pressure members are yieldably mounted individually so as to be movable towards and away from the surface of the drum independently of each other.

8. Apparatus as in claim 7, wherein the stays themselves are secured to a pair of arcuate frames mounted on the supporting framework one adjacent each end of the drum.

9. Apparatus as in claim 8, wherein the mounting of the frames provides for yieldably urging the frames towards the drum surface.

10. Apparatus as in claim 8 wherein the arcuate frames also serve rotatably to mount the stripping members.

11. Apparatus as in claim 8 wherein the frames are articulated at a point approximately midway along their periphery.

12. Apparatus as in claim 8 wherein the stripping members are in the form of rubber rollers formed with axial lobes constituting the strippers proper.

13. Apparatus as in claim 12, wherein the rollers are mounted on common shafts extending from the arcuate frames.

14. Apparatus as in claim 12 wherein the rollers are mounted on shafts, and the shafts are connected one to the other by individual chain or belt gearing so that they all rotate in the same direction.

15. Apparatus as in claim 11 wherein the stripping members are in the form of rubber rollers formed with axial lobes and the rollers mounted in the first articulated portion of the frames are driven at a slower speed than that of the group mounted in the second articulated portion.

16. Apparatus as in claim 14 wherein the shafts are driven by a common variable speed at one end of the frames.

17. Apparatus as in claim 4 wherein the drum is rotated in a sense to cause its surface to move towards the feeding mouth while the stripping members are rotated in the opposite sense to cause their peripheries opposing the drum to move in the same peripheral direction as that of the drum.

18. Apparatus as in claim 2 wherein the stripping members are disposed in adjacent rows and the members in each adjacent row are staggered peripherally of the movable member.

19. Apparatus as in claim 18 comprising a feed hopper opening on to the surface of the movable member and arranged to contain a quantity of the plants with their stems extending laterally of the movable member.

20. Apparatus as in claim 19 wherein the hopper is formed with a pivoted forward wall spring-loaded inwardly of the hopper.

* * * * *

UNITED STATES PATENT AND TRADEMARK OFFICE
CERTIFICATE OF CORRECTION

PATENT NO. : 3,935,867
DATED : February 3, 1976
INVENTOR(S) : George Wilfred Richardson It is certified that error appears in the above-identified patent and that said Letters Patent are hereby corrected as shown below:

Column 8, claim 16, line 2, following "speed" and preceding "at", insert --drive--.

Signed and Sealed this

Tenth Day of October 1978

[SEAL]

Attest:

RUTH C. MASON
*Attesting Officer*

DONALD W. BANNER
*Commissioner of Patents and Trademarks*